US010850586B2

(12) United States Patent
Sorniotti et al.

(10) Patent No.: US 10,850,586 B2
(45) Date of Patent: Dec. 1, 2020

(54) ANTI-ROLL MOMENT DISTRIBUTION ACTIVE SUSPENSION

(71) Applicant: Tenneco Automotive Operating Company Inc., Lake Forest, IL (US)

(72) Inventors: Aldo Sorniotti, Guildford (GB); Marco Ricco, Sarzana (IT); Miguel Dhaens, Lommel (BE); Christophe Lauwerys, Heverlee (BE); Bert Vandersmissen, Lovenjoel (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 33 days.

(21) Appl. No.: 16/110,025

(22) Filed: Aug. 23, 2018

(65) Prior Publication Data

US 2020/0062069 A1    Feb. 27, 2020

(51) Int. Cl.
*B60G 17/016*   (2006.01)
*B60G 17/019*   (2006.01)

(52) U.S. Cl.
CPC ... *B60G 17/0162* (2013.01); *B60G 17/01908* (2013.01); *B60G 2400/0513* (2013.01);
(Continued)

(58) Field of Classification Search
CPC .......... B60G 17/0162; B60G 17/01908; B60G 2400/0513; B60G 2800/80; B60G 2800/9122; B60G 2800/016
See application file for complete search history.

(56) References Cited

U.S. PATENT DOCUMENTS 4,937,748 A   6/1990  Yonekawa et al.
5,500,798 A * 3/1996  Inagaki ............... B60G 17/016
                                                  280/5.507
(Continued)

FOREIGN PATENT DOCUMENTS

CN   105172790 B   9/2017
JP     2946758 B2  9/1999
(Continued)

OTHER PUBLICATIONS

D.E. Williams, W.M. Haddad, "Nonlinear Control of Roll Moment Distribution to Influence Vehicle Yaw Characteristics," IEEE Trans. on Control Systems Technology, vol. 3, No. 1, pp. 110-116, 1995.
(Continued)

*Primary Examiner* — Rami Khatib
(74) *Attorney, Agent, or Firm* — Harness Dickey & Pierce

(57) ABSTRACT

A system for controlling a suspension of a vehicle includes a plurality of sensors, an anti-roll moment module configured to determine a front-to-total anti-roll moment distribution based on at least a first operating parameter of the vehicle, at least one suspension actuator, and a suspension control module configured to control the at least one suspension actuator based on the determined front-to-total anti-roll moment distribution. A method of producing an anti-roll moment distribution module for a vehicle includes determining understeer characteristics of the vehicle, determining a maximum lateral acceleration of the vehicle, adjusting the understeer characteristics based on the determined maximum lateral acceleration, determining reference understeer characteristics, determining a plurality of reference yaw rates and a plurality of feedforward contributions using a non-linear quasi-static model of the vehicle, storing
(Continued)

the reference yaw rates in a first look-up table, and storing the feedforward contributions in a second look-up table.

6 Claims, 5 Drawing Sheets

(52) U.S. Cl.
CPC .... *B60G 2800/016* (2013.01); *B60G 2800/80* (2013.01); *B60G 2800/9122* (2013.01)

(56) References Cited

U.S. PATENT DOCUMENTS

| | | | |
|---|---|---|---|
| 5,948,027 | A | 9/1999 | Oliver, Jr. et al. |
| 6,505,108 | B2 | 1/2003 | Bodie et al. |
| 6,567,731 | B2 | 5/2003 | Chandy |
| 7,191,047 | B2 | 3/2007 | Chen et al. |
| 7,571,039 | B2 | 8/2009 | Chen et al. |
| 7,835,846 | B2 | 11/2010 | Chen et al. |
| 8,321,088 | B2 | 11/2012 | Brown et al. |
| 8,626,389 | B2 | 1/2014 | Sidlosky |
| 8,712,639 | B2 | 4/2014 | Lu et al. |
| 9,878,738 | B2 | 1/2018 | Klier |
| 2003/0045980 | A1* | 3/2003 | Boswell ............. B60G 17/0195 701/41 |
| 2005/0222728 | A1* | 10/2005 | Hac ..................... B60W 10/184 701/38 |
| 2006/0058935 | A1 | 3/2006 | Ghoneim et al. |
| 2008/0054540 | A1* | 3/2008 | Buma ................. B60G 17/0162 267/195 |
| 2008/0167768 | A1* | 7/2008 | Rubenstein ............. B63B 39/04 701/21 |
| 2015/0224845 | A1* | 8/2015 | Anderson ............ B60G 17/019 701/37 |
| 2019/0039648 | A1* | 2/2019 | Kitta ..................... B62D 15/025 |
| 2020/0062069 | A1* | 2/2020 | Sorniotti ............ B60G 17/0162 |

FOREIGN PATENT DOCUMENTS

| | | |
|---|---|---|
| JP | 2007030832 A | 2/2007 |
| JP | 4021185 B2 | 12/2007 |
| KR | 20180068744 A | 6/2018 |

OTHER PUBLICATIONS

M. Abe, "A study on effects of roll moment distribution control in active suspension on improvement of limit performance of vehicle handling," Int. J of Vehicle Design, vol. 15, Nos. 3/4/5, pp. 326-336, 1994.

S.M. Hwang, Y. Park, "Active roll moment distribution based on predictive control," Int. J. of Vehicle Design, vol. 16, No. 1, pp. 15-28, 1995.

Y. Xu and M. Ahmadian, "Improving the capacity of tire normal force via variable stiffness and damping suspension system," Journal of Terramechanics, vol. 50, pp. 122-132, 2013.

International Search Report issued in related PCT Application No. PCT/US2019/043568 dated Nov. 13, 2019.

Written Opinion issued in related PCT application No. PCT/US2019/043568 dated Nov. 13, 2019.

* cited by examiner

ANTI-ROLL MOMENT DISTRIBUTION ACTIVE SUSPENSION

FIELD

The present disclosure relates to vehicle control systems and more particularly to systems and methods for vehicle suspension control.

BACKGROUND

In general, the anti-roll moment of a vehicle is a moment about the roll axis of the vehicle that counter acts a rotation of the vehicle body about the same axis, for example, a rotation caused by the lateral acceleration of the vehicle during cornering. The variation of the anti-roll moment distribution among the front and rear axles of a vehicle has an impact on the cornering response, especially at lateral acceleration levels close to the cornering limit. This is caused by the nonlinear behavior of typical automotive tires, characterized by an increase of the lateral force, ($F_y$), which is less than proportional to the increase of the vertical load ($F_z$) for a given value of slip angle. In cornering conditions, the load transfer ($\Delta F_z$) caused by the lateral acceleration of the vehicle, increases the vertical load on the outer wheel of the axle, and decreases the vertical load on the inner wheel. When two tires of the same axle are considered, the overall effect is a reduction of the total axle lateral force with $\Delta F_z$, or an increase of the slip angle value required for generating a given level of lateral axle force. In a first approximation, the sum of the load transfers on the front and rear axles in cornering is approximately constant with any suspension set-up, since it mainly depends on the geometric and inertial parameters of the vehicle. However, the load transfer distribution among the front and rear axles of a vehicle can be regulated through a controllable suspension system, which varies the front-to-total anti-roll moment distribution.

An increase of the anti-roll moment, and thus the load transfer, on the front suspension system of a vehicle increases the understeer of a vehicle. Conversely, an increase of the anti-roll moment on the rear suspension system of a vehicle reduces the understeer of the vehicle. Since control of vehicle understeer implies a variation of the yaw rate of the vehicle for a given steering input and vehicle speed, the control of the front-to-total anti-roll moment distribution can be adopted for vehicle yaw rate control. Thus, a controllable suspension system can be used for tracking a reference yaw rate.

Accordingly, a need exists for systems and methods for yaw rate control through the variation of a front-to-total suspension anti-roll moment distribution.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system for controlling a suspension of a vehicle is disclosed. The system includes a plurality of sensors. Each sensor of the plurality of sensors is configured to measure an operating parameter of the vehicle. The system further includes an anti-roll moment module configured to determine a front-to-total anti-roll moment distribution based on at least a first operating parameter of the vehicle measured by a first sensor of the plurality of sensors, at least one suspension actuator, and a suspension control module configured to control the at least one suspension actuator based on the determined front-to-total anti-roll moment distribution.

In other features, the anti-roll moment module includes a feedforward module configured to determine a feedforward contribution based on at least the first operating parameter of the vehicle. The front-to-total anti-roll moment distribution is based on the determined feedforward contribution.

In further features, the feedforward module includes a first look-up table. The first look-up table includes a first plurality of entries and each entry of the first plurality of entries includes a feedforward contribution value based on a non-linear quasi-static model of the vehicle. The feedforward module is further configured to (i) select a first entry of the first plurality of entries of the first look-up table based on the first operating parameter and (ii) determine the feedforward contribution based on the first entry of the first plurality of entries.

In other features, the anti-roll moment module includes a yaw rate module configured to determine a reference yaw rate based on at least the first operating parameter of the vehicle. The front-to-total anti-roll moment distribution is based on the determined reference yaw rate.

In further features, the yaw rate module includes a second look-up table. The second look-up table includes a second plurality of entries and each entry of the second plurality of entries includes a reference yaw rate value based on the non-linear quasi-static model of the vehicle. The yaw rate module is further configured to (i) select a first entry of the second plurality of entries of the second look-up table and (ii) determine the reference yaw rate based on the first entry of the second plurality of entries.

In other features, the anti-roll moment module includes an error module configured to determine a yaw rate error based on (i) the reference yaw rate and (ii) a second operating parameter of the vehicle measured by a second sensor of the plurality of sensors and a feedback module configured to determine a feedback contribution based on the yaw rate error. The second operating parameter is a yaw rate of the vehicle. The feedback module is configured to determine the feedback contribution by applying a correction to the yaw rate error based on proportional, integral, and derivative terms. In further features, the anti-roll module includes a front-to-total module configured to determine the front-to-total anti-roll moment distribution based on the feedforward contribution and the feedback contribution.

In yet other features, the anti-roll moment module includes an adjusting module configured to determine an adjusted feedforward contribution based on (i) the feedforward contribution and (ii) at least one of the yaw rate error or a slip angle of a rear axle of the vehicle. The anti-roll module also includes a front-to-total module configured to determine the front-to-total anti-roll moment distribution based on the adjusted feedforward contribution and the feedback contribution.

A method of controlling a suspension of a vehicle is disclosed. The method includes obtaining a plurality of operating parameters of the vehicle, determining a front-to-total anti-roll moment distribution based on at least a first operating parameter of the plurality of operating parameters of the vehicle, and adjusting at least one controllable suspension actuator of the vehicle based on the determined front-to-total anti-roll moment distribution.

In yet other features, the method includes determining a feedforward contribution based on at least the first operating parameter of the vehicle. The front-to-total anti-roll moment distribution is based on the determined feedforward contribution.

In further features, determining the feedforward contribution includes selecting a first entry from a first look-up table. The first look-up table includes a first plurality of entries and each entry of the first plurality of entries includes a feedforward contribution value that is based on a non-linear quasi-static model of the vehicle.

In other features, the method includes determining a reference yaw rate based on at least the first operating parameter of the vehicle. The front-to-total anti-roll moment distribution is based on the determined reference yaw rate.

In further features, determining the reference yaw rate includes selecting a first entry from a second look-up table. The second look-up table includes a second plurality of entries and each entry of the second plurality of entries includes a reference yaw rate value that is based on the non-linear quasi-static model of the vehicle.

In other features, the method includes determining a yaw rate error based on (i) the reference yaw rate and (ii) a second operating parameter of the plurality of operating parameters of the vehicle. The second operating parameter is a yaw rate of the vehicle. The method further includes applying a correction to the yaw rate error based on proportional, integral, and derivative terms to determine a feedback contribution. In further features, determining the front-to-total anti-roll moment distribution includes adding the feedforward contribution to the feedback contribution.

In yet other features, the method includes determining an adjusted feedforward contribution based on (i) the feedforward contribution and (ii) at least one of the yaw rate error or a slip angle of a rear axle of the vehicle. Determining the front-to-total anti-roll moment distribution includes adding the adjusted feedforward contribution to the feedback contribution.

A method of producing an anti-roll moment distribution module for a vehicle is disclosed. The method includes determining understeer characteristics of the vehicle, determining a maximum lateral acceleration of the vehicle, adjusting the understeer characteristics of the vehicle based on the determined maximum lateral acceleration, determining reference understeer characteristics, determining a plurality of reference yaw rates based on (i) the maximum lateral acceleration and (ii) the reference understeer characteristics using a non-linear quasi-static model of the vehicle, storing the plurality of reference yaw rates in a first look-up table in the anti-roll moment distribution module, and determining a plurality of feedforward contributions using the non-linear quasi-static model of the vehicle. Each feedforward contribution of the plurality of feedforward contributions can be used to determine a front-to-total anti-roll moment distribution for the vehicle. The method further includes storing the plurality of feedforward contributions in a second look-up table in the anti-roll moment distribution module.

In other features, the non-linear quasi-static model of the vehicle includes a set of equations and inequalities. Determining the understeer characteristics includes starting to solve the set of equations and inequalities using (i) increasing lateral acceleration values and (ii) constant velocity values and stopping in response to being unable to find a valid solution to the set of equations and inequalities.

In yet other features, determining the maximum lateral acceleration of the vehicle includes performing a minimization procedure on a cost function. In further features, determining the plurality of reference yaw rates and determining the plurality of feedforward contributions includes solving the set of equations and inequalities without using forward time integration.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
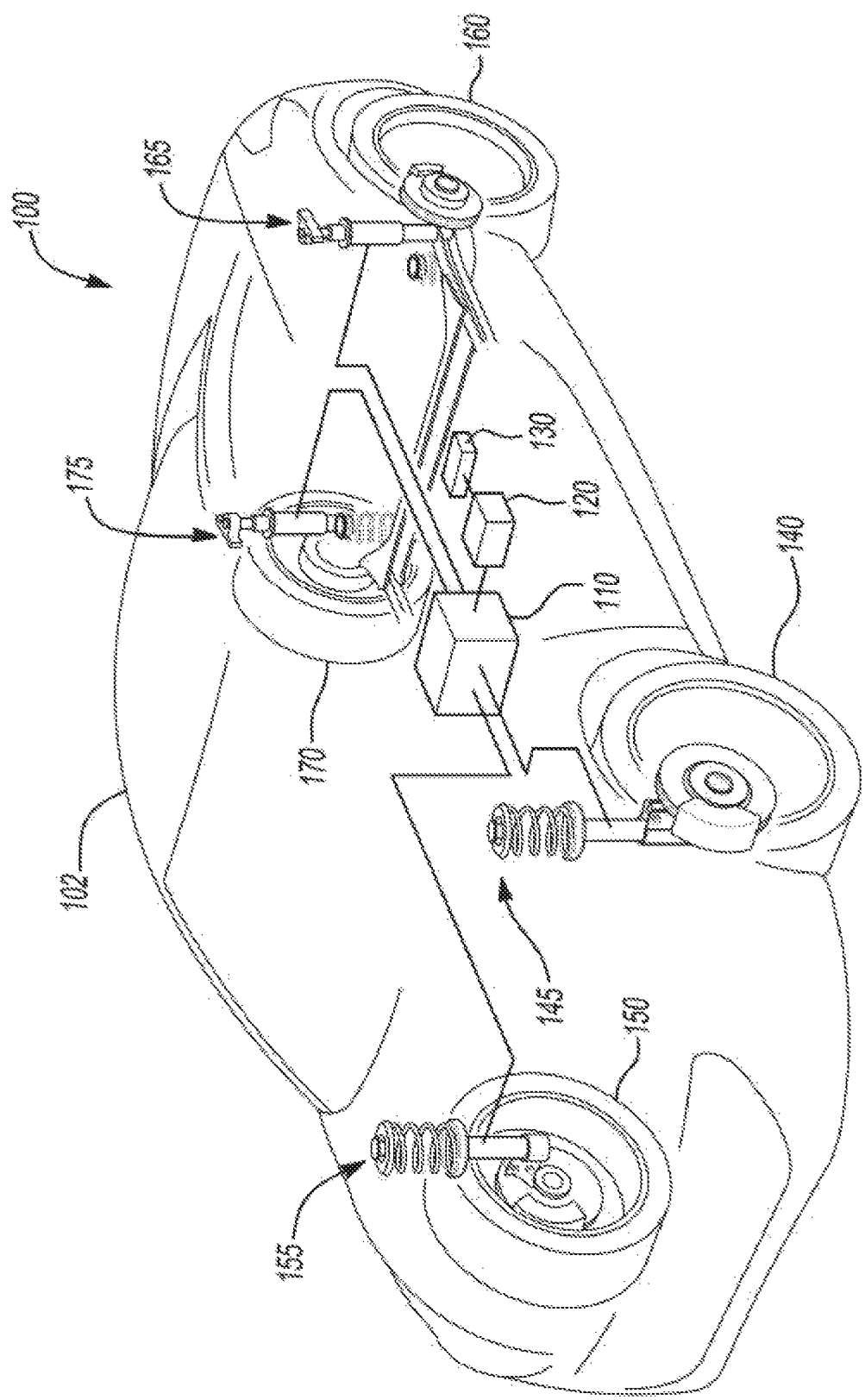
FIG. 1 is a diagrammatic illustration of a vehicle incorporating an anti-roll moment distribution system in accordance with the teachings of the present disclosure.

The following description is merely exemplary in nature and is not intended to limit the present disclosure, application, or uses. FIG. 1 shows a vehicle 100 incorporating an anti-roll moment distribution system. The vehicle 100 includes a body 102, a suspension control module 110 configured to set and/or adjust controllable suspension components of the vehicle, and an anti-roll moment distribution module 120 configured to determine a front-to-total anti-roll moment distribution based on operating parameters of the vehicle 100. The vehicle 100 also includes sensors 130 configured to measure the operating parameters of the vehicle 100. In some implementations, the sensors 130 include a steering wheel angle sensor, a velocity sensor, a longitudinal acceleration sensor, and a yaw rate sensor. In other implementations, the sensors 130 may include additional or different sensors. While the vehicle 100 has been depicted as a passenger car, the anti-roll moment distribution system described herein may be suitably incorporated as part of other types of vehicles and/or in other types of applications, such as vehicles incorporating independent front and/or independent rear suspension systems.

The vehicle 100 includes a first front wheel 140. The first front wheel 140 includes a first front controllable suspension actuator 145. The suspension control module 110 is connected to the first front controllable suspension actuator 145. The suspension control module 110 is configured to set and/or adjust vertical force applied by the first front controllable suspension actuator 145 to the first front wheel 140.

Further, the vehicle 100 includes a second front wheel 150. The second front wheel 150 includes a second front controllable suspension actuator 155. The suspension control module 110 is connected to the second front controllable suspension actuator 155. The suspension control module 110 is configured to set and/or adjust vertical force applied by the second front controllable suspension actuator 155 to the second front wheel 150.

The vehicle 100 also includes a first rear wheel 160. The first rear wheel 160 includes a first rear controllable suspension actuator 165. The suspension control module 110 is connected to the first rear controllable suspension actuator 165. The suspension control module 110 is configured to set and/or adjust vertical force applied by the first rear controllable suspension actuator 165 to the first rear wheel 160.

Further still, the vehicle 100 includes a second rear wheel 170. The second rear wheel 170 includes a second rear controllable suspension actuator 175. The suspension control module 110 is connected to the second rear controllable suspension actuator 175. The suspension control module 110 is configured to set and/or adjust vertical force applied by the second rear controllable suspension actuator 175 to the second rear wheel 170.

The anti-roll moment distribution module 120 generates a front-to-total signal. The value of the front-to-total signal represents the front-to-total anti-roll moment distribution (f) required to maintain a specific cornering behavior of the vehicle 100. The front-to-total anti-roll moment distribution (f) may be expressed as a ratio of the front controllable anti-roll moment contribution ($M_{AR,F,Act}$) of the vehicle 100—e.g., the anti-roll moment contribution from the first front controllable suspension actuator 145 and the second front controllable suspension actuator 155—to the total anti-roll moment contribution ($M_{AR,Act,tot}$) of the vehicle 100—e.g., the anti-roll moment contribution from the first front controllable suspension actuator 145, the second front controllable suspension actuator 155, the first rear controllable suspension actuator 165, and the second rear controllable suspension actuator 175. For example, the following formula may be used to express the front-to-total anti-roll moment distribution (f):

$$f = \frac{M_{AR,F,Act}}{M_{AR,Act,tot}}$$

The suspension control module 110 sets and/or adjusts the controllable suspension components of the vehicle 100—e.g., the first front controllable suspension actuator 145, the second front controllable suspension actuator 155, the first rear controllable suspension actuator 165, the second rear controllable suspension actuator 175—based on the front-to-total signal generated by the anti-roll moment distribution module 120. For example, the suspension control module 110 may control the first front controllable suspension actuator 145 and the second front controllable suspension actuator 155 based on the following formula:

$$M_{AR,F,Act} = f M_{AR,Act,tot}$$

$M_{AR,F,Act}$ represents the front controllable anti-roll moment contribution of the vehicle 100—e.g., the anti-roll moment contribution from the first front controllable suspension actuator 145 and the second front controllable suspension actuator 155.

The suspension control module may control the first rear controllable suspension actuator 165 and the second rear controllable suspension actuator 175 using the following formula:

$$M_{AR,R,Act} = (1-f) M_{AR,Act,tot}$$

$M_{AR,R,Act}$ represents the rear controllable anti-roll moment contribution of the vehicle 100—e.g., the anti-roll moment contribution from the first rear controllable suspension actuator 165 and the second rear controllable suspension actuator 175.

While the vehicle 100 has been depicted as including controllable suspension actuators located on each vehicle corner, the anti-roll moment distribution system described herein may be suitably incorporated as part of other types of vehicles and/or in other types of applications. For example, the anti-roll moment distribution system described herein may be suitably incorporated into vehicles with controllable suspension actuators located only on the front or rear corners, a vehicle with controllable anti-roll bars—i.e., stabilizer bars—on either the front axles, the rear axle, or both axles, or vehicles with any other system capable of controlling the vertical load on the wheels of at least one axle of the vehicle 100.

Figure 2:
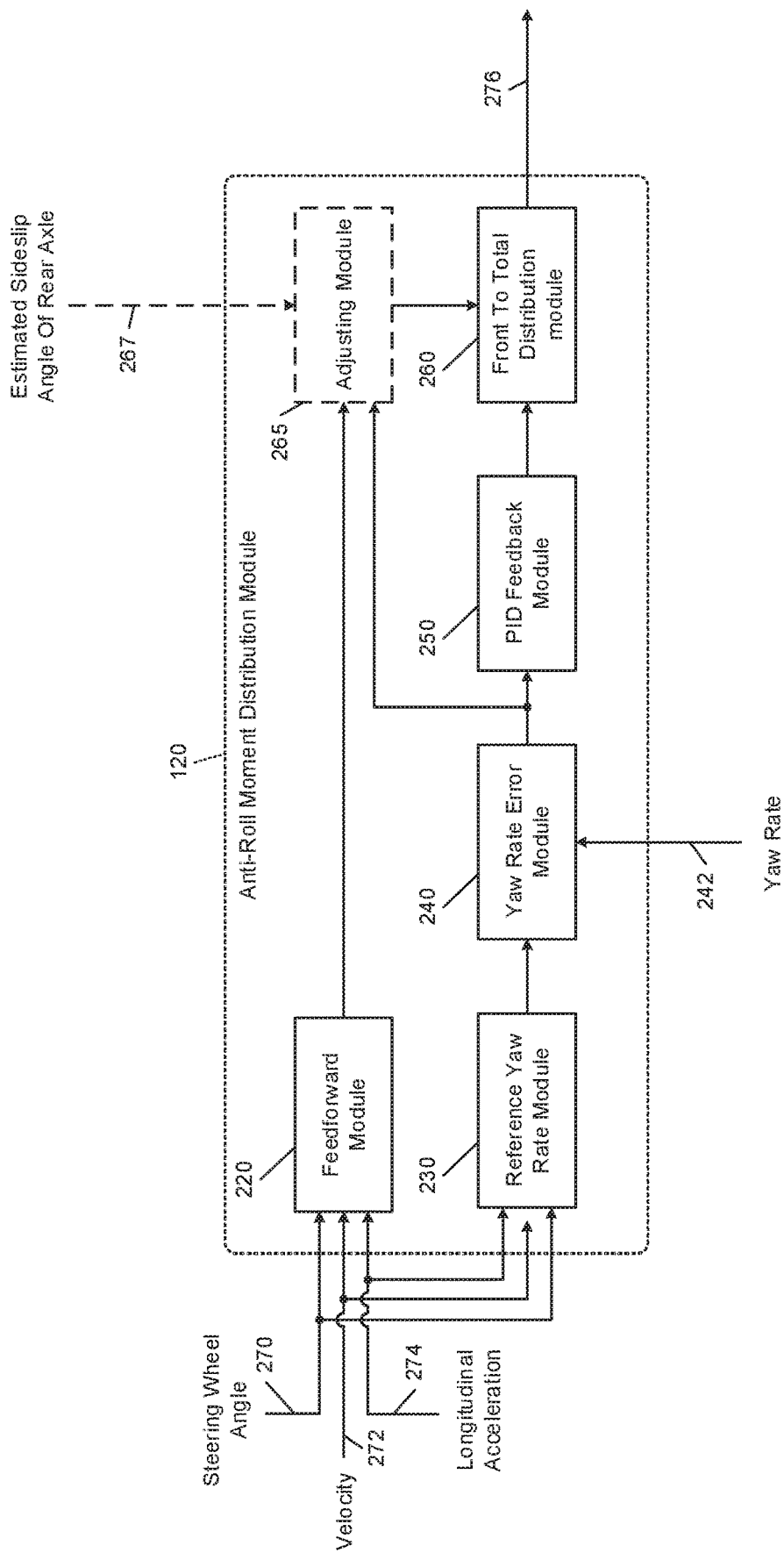
FIG. 2 is a functional block diagram of an example anti-roll module according to the principals of the present disclosure.

FIG. 2 is a functional block diagram of the anti-roll moment distribution module 120. The anti-roll moment distribution module 120 includes a feedforward module 220, a reference yaw rate module 230, a yaw rate error module 240, a proportional-integral-derivative (PID) feedback module 250, and a front-to-total distribution module 260. In some implementations, the anti-roll moment distribution module 120 also includes an adjusting module 265. The feedforward module 220 and the reference yaw rate module 230 receive signals from various vehicle sensors—such as, sensors 130—that represent different operating parameters associated with the vehicle 100. The signals may include a steering wheel angle signal 270, a velocity signal 272, and an acceleration signal 274. The steering wheel angle signal 270 represents the current angle of the front wheels of the vehicle 100. The velocity signal 272 and the acceleration signal 274 represent the current velocity and longitudinal acceleration of the vehicle 100, respectively.

The feedforward module 220 generates a feedforward signal based on the values of the sensor signals. The feedforward signal represents a feedforward contribution to the front-to-total anti-roll moment distribution that is associated with the current operating parameters of the vehicle 100—i.e., the values of the received sensor signals. The feedforward module 220 includes a look-up table that stores a plurality of feedforward contribution values. Each stored feedforward contribution value is associated with a unique set of vehicle parameters. For example, each feedforward contribution value may be associated with a steering wheel angle, a velocity, and a longitudinal acceleration. Each feedforward contribution value may also be associated with different or additional vehicle parameters—such as, a tire-road friction coefficient ($\mu$). The stored feedforward contribution values and associated vehicle operating parameters are based on a non-linear quasi-static model of the vehicle 100. The feedforward module 220 compares the values of the received sensor signals to the stored values in the look-up table. For example, the feedforward module 220 selects a stored feedforward value associated with vehicle parameters that match the values of the steering wheel angle signal 270, the velocity signal 272, and the acceleration signal 274. The feedforward module 220 generates the feedforward signal based on the selected feedforward value and then outputs the generated signal. For example, if the anti-roll moment distribution module 120 includes the adjusting module 265, the feedforward signal is outputted to the adjusting module 265. Otherwise, the feedforward module 220 outputs the feedforward signal to the front-to-total distribution module 260.

The reference yaw rate module 230 generates a reference yaw rate signal based on the values of the sensor signals. The reference yaw rate signal represents a yaw rate associated with the current operating parameters of the vehicle 100—for example, values of the signals from the sensors. The reference yaw rate module 230 includes a look-up table that stores a plurality of yaw rates. Each yaw rate in the look-up table is associated with a set of vehicle operating parameters. For example, each yaw rate may be associated with a steering wheel angle, a velocity, and a longitudinal acceleration. Each yaw rate value may also be associated with other vehicle operating parameters—such as, a tire-road friction coefficient (μ). Similar to the feedforward values stored in the feedforward module 220, the stored yaw rates and associated vehicle parameters are based on the non-linear quasi-static model of the vehicle 100. The reference yaw rate module 230 matches the current values of the steering wheel angle signal 270, the velocity signal 272, and the acceleration signal 274 to a stored yaw rate and then outputs a signal that represents the stored yaw rate.

In various implementations, the feedforward module 220 and the reference yaw rate module 230 may use a torque demand in traction and braking of the vehicle 100 or accelerator and brake pedal inputs in place of the velocity signal 272 and/or the acceleration signal 274. The feedforward module 220 and the reference yaw rate module 230 may also receive an estimated current tire-road friction coefficient (μ). In other implementations, the feedforward module 220 and the reference yaw rate module 230 may receive a signal that represents the average steering angle of the front wheels of the vehicle 100 in place of the steering wheel angle signal 270. In some implementations, the feedforward module 220 and the reference yaw rate module 230 may use alternative and/or additional signals to generate the feedforward signal and the reference yaw rate signal, respectively.

The yaw rate error module 240 is configured to generate a yaw rate error signal. The yaw rate error module 240 receives the reference yaw rate signal generated by the reference yaw rate module 230. The yaw rate error module 240 also receives a yaw rate signal 242 that represents the current yaw rate of the vehicle 100. The yaw rate error module 240 compares the reference yaw rate to the current yaw rate of the vehicle 100 and outputs a yaw rate error signal that represents the difference between the value of the reference yaw rate and the value of the current yaw rate of the vehicle 100. The yaw rate error module 240 outputs the yaw rate error signal to the PID feedback module 250. The yaw rate error module 240 may also output the yaw rate error signal to the adjusting module 265.

The PID feedback module 250 is configured to receive the yaw rate error signal and output a feedback contribution signal. For example, the PID feedback module 250 applies a correction to the yaw rate error signal based on proportional, integral, and derivative terms. The PID feedback module 250 then outputs the results of the correction as the feedback contribution signal.

The adjusting module 265 is configured to output an adjusted feedforward contribution signal. In some implementations, the adjusting module 265 receives a slip angle signal 267 that represents an estimation of the slip angle of a rear axle ($\beta_R$) of the vehicle 100. To prevent undesired system responses in extreme conditions, a progressive deactivation algorithm is apply to the feedforward contribution—i.e., the value of the feedforward signal received from the feedforward module 220. For example, the adjusting module 265 may use the following equation to determine an adjusted feedforward contribution:

$$f_{FFW} = w_{FFW}(|\Delta r|, |\beta_R|) f_{FFW,SS} TF + (1 - w_{FFW}(|\Delta r|, |\beta_R|)) f_{nominal}$$

$w_{FFW}$ is a weighting whose value is 1 during normal vehicle operation and progressively decreases to zero in cases of significant yaw error rates ($\Delta r$) or rear axle sideslip angles ($\beta_R$). $f_{nominal}$ represents a front-to-total anti-roll moment of the vehicle 100 without the anti-roll moment distribution module 120. $f_{FFW,SS}$ represents the feedforward contribution determined by the feedforward module 220, and $f_{FFW}$ represents the adjusted feedforward contribution. The adjusting module 265 outputs a signal that represents the adjusted feedforward contribution.

In some implementations, the adjusting module 265 includes a 2 dimensional look-up table that is used to determine the value of $w_{FFW}(|\Delta r|, |\beta_R|)$. In other implementations, the value of $w_{FFW}(|\Delta r|, |\beta_R|)$ may be determined as a product of two factors. For example, the value of $w_{FFW}(|\Delta r|, |\beta_R|)$ may be calculated using the following formula:

$$w_{FFW}(|\Delta r|, |\beta_R|) = w_{FFW,\Delta r} \cdot w_{FFW,\beta_R}$$

The first factor ($w_{FFW,\Delta r}$) may be determined using the following formula:

$$w_{FFW,\Delta r} = \begin{cases} 1 & \text{if } |\Delta r| < \Delta r_{act} \\ \dfrac{\Delta r_{th} - |\Delta r|}{\Delta r_{th} - \Delta r_{act}} & \text{if } |\Delta r| \le \Delta r_{th} \\ 0 & \text{if } |\Delta r| > \Delta r_{th} \end{cases}$$

$\Delta r_{act}$ is a yaw error rate activation threshold and $\Delta r_{th}$ is a yaw error rate upper threshold. The yaw rate of the vehicle 100 changes relative to both the speed of the vehicle 100 and the lateral acceleration of the vehicle 100. As a result, the yaw error rate activation threshold ($\Delta r_{act}$) and the yaw error rate upper threshold ($\Delta r_{th}$) change dynamically based on the speed of the vehicle 100 and the lateral acceleration of the vehicle 100. For example, the following formulas may be used to determine the yaw error rate activation threshold ($\Delta r_{act}$) and the yaw error rate upper threshold ($\Delta r_{th}$):

$$\Delta r_{act} = \frac{a_{y,act}}{V}$$

$$\Delta r_{th} = \frac{a_{y,th}}{V}$$

V is the speed of the vehicle 100. $a_{y,act}$ is a predetermined lateral acceleration activation threshold. In various implementations, the predetermined lateral acceleration activation threshold ($a_{y,act}$) may be 3 m/s² to 5 m/s². $a_{y,th}$ is a predetermined lateral acceleration upper threshold. The predetermined lateral acceleration upper threshold ($a_{y,th}$) may be any value greater than the value of the predetermined lateral acceleration activation threshold ($a_{y,act}$).

The second factor ($w_{FFW,\beta_R}$) may be determined using the following formula:

$$w_{FFW,\beta_R} = \begin{cases} 1 & \text{if } |\beta_R| < \beta_{act} \\ \dfrac{\beta_{th} - |\beta_R|}{\beta_{th} - \beta_{act}} & \text{if } |\beta_R| \le \beta_{th} \\ 0 & \text{if } |\beta_R| > \beta_{th} \end{cases}$$

β$_{act}$ is a predetermined rear axle sideslip angle activation threshold. In some implementations, the rear axle sideslip angle activation threshold (β$_{act}$) may be 3 degrees to 5 degrees. β$_{th}$ is a predetermined rear axle sideslip angle upper threshold. The rear axle sideslip angle upper threshold (β$_{th}$) may be any value greater than the value of the rear axle sideslip angle activation threshold (β$_{act}$). In some implementations, the rear axle sideslip angle upper threshold (β$_{th}$) may be 5 degrees to 8 degrees.

TF is a first-order low pass filter. The value of TF may be determined using the following formula:

$$TF(z) = \frac{\Delta t + \Delta t z^{-1}}{\left(\Delta t + \frac{2}{2\pi f_{c,W}}\right) + \left(\Delta t - \frac{2}{2\pi f_{c,W}}\right) z^{-1}}$$

$f_{c,W}$ represents the cutoff frequency of the low pass filter. In some implementations, TF may have a cutoff frequency of 5 Hz—i.e., $f_{c,W}$ is equal to 5. In other implementations, TF may have a cutoff frequency of 1 Hz. In yet other implementations, TF may have a cutoff frequency between 1 Hz and 5 Hz.

The front-to-total distribution module 260 receives the feedback contribution signal generated by the PID feedback module 250 and either the feedforward signal generated by the feedforward module 220 or the adjusted feedforward signal from the adjusting module 265. The front-to-total distribution module 260 adds the feedforward signal, or the adjusted feedforward signal, to the feedback contribution signal to generate a front-to-total signal 276. The front-to-total distribution module 260 then outputs the front-to-total signal 276—for example, to the suspension control module 110.

The feedforward contribution values stored in the feedforward module 220 and reference yaw rates stored in the reference yaw rate module 230 are based on the non-linear quasi-static model of the vehicle 100. The quasi-static model is used to calculate the understeer characteristics of the vehicle 100 for non-zero values of longitudinal acceleration at a given speed. Such a calculation is not a trivial task in case of a simulation model in the time domain, as it requires a careful set-up of multiple maneuvers. This property makes the quasi-static model ideal for the design of non-linear feedforward contributions. To track a generic steady-state reference yaw rate, the corresponding steady-state front-to-total anti-roll moment distribution is a non-linear function of the driver inputs and vehicle operating conditions—i.e., the vehicle operating parameters. In various implementations, the quasi-static model has eight degrees of freedom—for example, the longitudinal, lateral, roll, and yaw motions of the vehicle 100 and the rotation of each wheel of the vehicle 100. In some implementations, the quasi-static model may have seven or fewer degrees of freedom. In other implementations, the quasi-static model may have nine or more degrees of freedom.

In practice, given the complexity of the cornering behavior of the vehicle 100, a realistic steady-state front-to-total anti-roll moment distribution cannot be determined through a single open formula. Moreover, the reference yaw rate and feedforward contribution values used must be consistent with each other, and compatible with both the achievable cornering response and the actuator limitations of the vehicle 100. Therefore, the reference yaw rates and the feedforward contributions are determined based on the non-linear quasi-static vehicle model of the vehicle 100 offline and stored in the respective look-up tables. The look-up tables enable the anti-roll moment distribution module 120 to determine feedforward contributions and the reference yaw rates that correspond to the operating parameters of the vehicle 100 in real-time, while ensuring that the determined values are consistent with each other, and compatible with both the achievable cornering response and the actuator limitations of the vehicle 100.

The look-up tables in the feedforward module 220 and the reference yaw rate module 230 are generated offline using the quasi-static model to calculate the necessary values for the steady-state feedforward front-to-total anti-roll moment distribution—$f_{FFW,ss}(\delta_{sw}, V, a_x)$—and the steady-state reference yaw rate—$r_{ref,ss}(\delta_{sw}, V, a_x)$. The time derivatives of vehicle sideslip angle (β), roll angle (φ), and wheel slip ratios (σ$_i$) are assumed to be zero. In this way, the quasi-static model results in a set of algebraic equations that can be solved for different operating conditions of the vehicle, without requiring forward time integration.

Figure 3A:
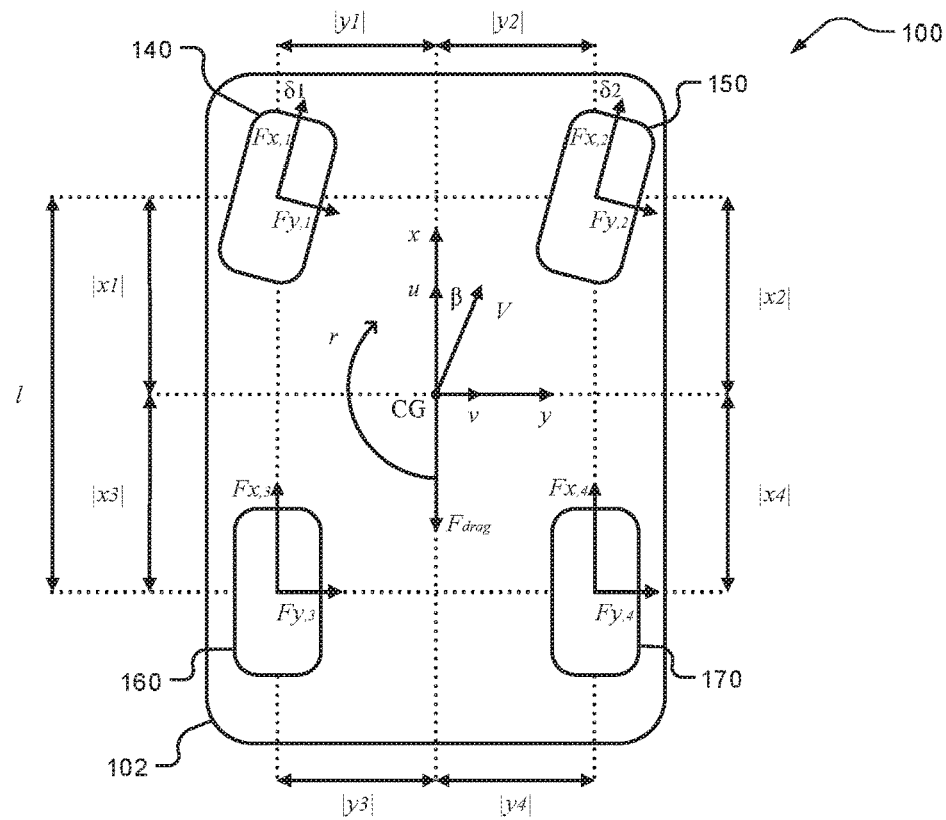
FIG. 3A is a top view of the vehicle that depicts variables used in a quasi-static model of the vehicle.
Figure 3B:
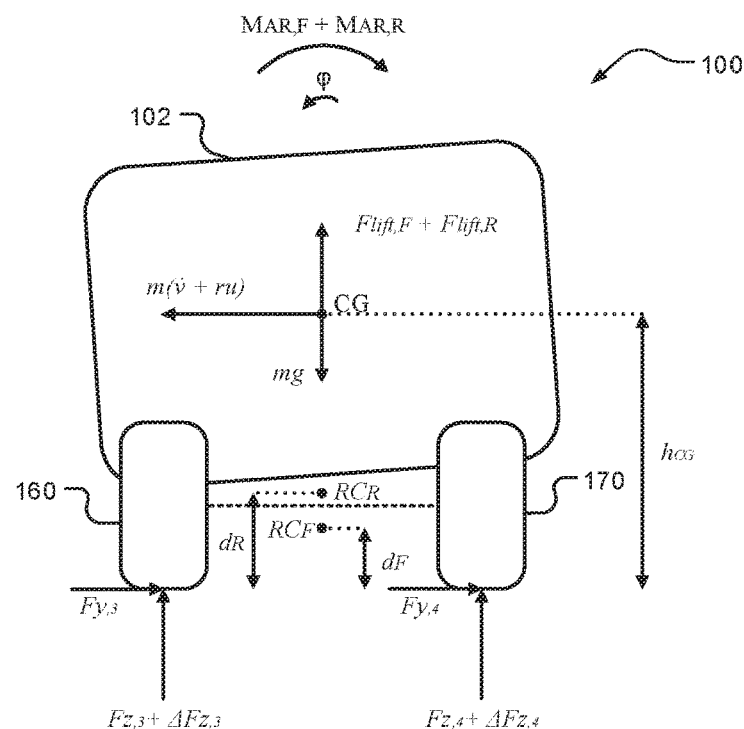
FIG. 3B is a rear view of the vehicle that depicts variables used in a quasi-static model of the vehicle.

FIGS. 3A and 3B depict various variables associated with the non-linear quasi-static model of the vehicle 100. FIG. 3A is a top view of the vehicle 100 and FIG. 3B is a rear view of the vehicle 100. With reference to FIGS. 3A and 3B, in the resulting set of algebraic equations: m is the mass of the vehicle 100; CG is the center of gravity of the vehicle 100; u is the component of the velocity vector at the center of gravity along the longitudinal axis of the vehicle reference system; v is the component of the velocity vector at the center of gravity along the lateral axis of the vehicle reference system; r is the vehicle yaw rate; $F_{x,i}$ is the longitudinal force of the i-th tire; $F_{y,i}$ is the lateral force of the i-th tire; δ$_i$ is the steering angle of the i-th wheel; $F_{drag}$ is the aerodynamic drag force; x$_i$ is the longitudinal coordinate of the i-th wheel with respect to the vehicle center of gravity; y$_i$ is the lateral coordinate of the i-th wheel with respect to the vehicle center of gravity; $M_{z,i}$ is the self-alignment moment of the i-th tire; $h_{CG}$ is the height of the vehicle center of gravity; $d_F$ is the front suspension roll center height; $d_R$ is the rear suspension roll center height; $M_{AR,F}$ is the front suspension anti-roll moment; and $M_{AR,R}$ is the rear suspension anti-roll moment.

In some implementations, the longitudinal force balance of the vehicle 100 may be calculated using the following formula:

$$m(\dot{u} - rv) = \sum_{i=1}^{4} F_{x,i} \cos\delta_i - \sum_{i=1}^{4} F_{y,i} \sin\delta_i - F_{drag}$$

The lateral force balance of the vehicle 100 may be calculated using the following formula:

$$m(\dot{v} - ru) = \sum_{i=1}^{4} F_{x,i} \sin\delta_i + \sum_{i=1}^{4} F_{y,i} \cos\delta_i$$

The yaw moment balance of the vehicle 100 may be calculated using the following formula:

$$\sum_{i=1}^{4} F_{x,i} \sin\delta_i x_i + \sum_{i=1}^{4} F_{y,i} \cos\delta_i x_i -$$

$$\sum_{i=1}^{4} F_{x,i}\cos\delta_i y_i + \sum_{i=1}^{4} F_{y,i}\sin\delta_i y_i + \sum_{i=1}^{4} M_{z,i} = 0$$

The roll moment balance of the vehicle 100 may be calculated using the following formula:

$$M_{AR,F} + M_{AR,R} = m(\dot{v} - ru)(h_{CG} - d_f)\cos\varphi +$$

$$mg(h_{CG} - d_F)\sin\varphi - \left(\sum_{i=3}^{4} F_{x,i}\sin\delta_i + \sum_{i=3}^{4} F_{y,i}\cos\delta_i\right)(d_R - d_F)$$

Further, the moment balance for the i-th wheel of the vehicle 100 may be calculated using the following formula:

$$T_{dr,i} - T_{b,i} - F_{x,i}R_{l,i} - M_{y,i} - J_{w,i}\dot{\omega}_i = 0$$

$T_{dr,i}$ is the i-th drivetrain torque, referred to the i-th wheel; $T_{b,i}$ is the braking torque at the i-th corner; $J_{w,i}$ is the mass moment of inertia of the i-th wheel, including the relevant drivetrain contributions depending on the drivetrain architecture; $\dot{\omega}_i$ is the angular acceleration of the i-th wheel. In some implementations, mathematical conditions may be imposed on $T_{dr,i}$ and $T_{b,i}$ to emulate the behavior of different drivetrain or braking system architectures, or the intervention of a chassis control system based on direct yaw moment control.

The angular acceleration of the i-th wheel ($\dot{\omega}_i$) may be calculated using the following formula:

$$\dot{\omega}_I \cong \frac{\dot{V}_{x,i}}{R_{e,i}}(\sigma_i + 1)$$

$R_{l,i}$ is the laden radius of the i-th wheel characterized by a rolling radius $R_{e,i}$ and $\sigma_i$ is the slip ratio of the i-th tire.

The vertical tire load ($F_z$) of the first front wheel 140 ($F_{z,1}$) and the second front wheel 150 ($F_{z,2}$) may be calculated using the following formula and inequality:

$$F_z = \frac{1}{2}\left(mg\frac{b}{l} - m(\dot{u} - rv)\frac{h_{CG}}{l} - F_{drag}\frac{h_{CG}}{l} - F_{lift,F}\right) \pm$$

$$\frac{\left(\sum_{i=1}^{2} F_{x,i}\sin\delta_i + \sum_{i=1}^{2} F_{y,i}\cos\delta_i\right)d_F + M_{AR,F}}{t_F}$$

$$0 \le F_z \le mg\frac{b}{l} - m(\dot{u} - rv)\frac{h_{CG}}{l} - F_{drag}\frac{h_{CG}}{l} - F_{lift,F}$$

$F_{lift,F}$ is the aerodynamic lift force of the front of the vehicle 100 and l is the wheelbase of the vehicle 100. b represents the rear semi-wheelbase of the vehicle 100—i.e., the distance between the center of gravity of the vehicle 100 (CG) and the rear axle. For example, with continued reference to FIG. 3A, b may be equal to either $x_3$ or $x_4$.

The vertical tire load ($F_z$) of the first rear wheel 160 ($F_{z,3}$) and the second rear wheel 170 ($F_{z,4}$) may be calculated using the following formula and inequality:

$$F_z = \frac{1}{2}\left(mg\frac{a}{l} + m(\dot{u} - rv)\frac{h_{CG}}{l} + F_{drag}\frac{h_{CG}}{l} - F_{lift,R}\right) \pm$$

$$\frac{\left(\sum_{i=3}^{4} F_{x,i}\sin\delta_i + \sum_{i=3}^{4} F_{y,i}\cos\delta_i\right)d_R + M_{AR,R}}{t_R}$$

$$0 \le F_z \le mg\frac{a}{l} + m(\dot{u} - rv)\frac{h_{CG}}{l} + F_{drag}\frac{h_{CG}}{l} - F_{lift,R}$$

$F_{lift,R}$ is the aerodynamic lift force of the rear of the vehicle 100. a represents the front semi-wheelbase of the vehicle 100—i.e., the distance between the center of gravity of the vehicle 100 (CG) and the front axle. For example, with continued reference to FIG. 3A, a may be equal to either $x_1$ or $x_2$.

With respect to calculating the vertical tire load ($F_z$), the inequalities are necessary to express the fact that if a wheel lifts from the road surface, the respective vertical tire load cannot become negative. In such a condition, the vertical load on the opposite wheel of the axle cannot exceed the total vertical load on the axle, which is expressed by the right-hand term of each inequality.

The front anti-roll moment ($M_{AR,F}$) of the vehicle 100 may be calculated using the following formula:

$$M_{AR,F} = M_{AR,F,Pass} + M_{AR,F,Act}$$

$M_{AR,F,Pass}$ represents the front passive anti-roll moment contribution of the vehicle 100. $M_{AR,F,Act}$ represents the front controllable anti-roll moment contribution of the vehicle 100—e.g., the anti-roll moment contribution from the first front controllable suspension actuator 145 and the second front controllable suspension actuator 155.

Similarly, the rear anti-roll moment ($M_{AR,R}$) of the vehicle 100 may be calculated using the following formula:

$$M_{AR,R} = M_{AR,R,Pass} + M_{AR,R,Act}$$

$M_{AR,R,Pass}$ represents the rear passive anti-roll moment contribution of the vehicle 100. $M_{AR,R,Act}$ represents the rear controllable anti-roll moment contribution of the vehicle 100—e.g., the anti-roll moment contribution from the first rear controllable suspension actuator 165 and the second rear controllable suspension actuator 175.

The total anti-roll moment of all of the controllable suspension actuators of the vehicle 100 ($M_{AR,Act,tot}$) may be calculated using various methods. For example, the desired roll angle characteristic of the vehicle 100 may be determined as a function of lateral acceleration of the vehicle 100. Alternatively, the desired roll characteristic of the vehicle 100 may be determined as a function of the steering wheel angle and velocity of the vehicle 100. The quasi-static model of the vehicle 100 includes considerations of the actuation ratio limitations of the controllable suspension actuators of the vehicle 100.

The equations of the quasi-static model of the vehicle 100 are solved without forward integration in the time domain. In various implementations, the non-linear system of equalities and inequalities of the quasi-static model of the vehicle 100 may be solved using the Matlab nonlinear optimization function $f_{mincon}$. While $f_{mincon}$ is an optimization function, it may also be used as a solver by adopting a zero objective function. For example, the quasi-static model equations may be imposed as equality constraints and the physical vehicle and controllable suspension actuator limitations may be imposed as inequality constraints. In the event of multiple valid solutions—e.g., the vehicle 100 includes other active systems providing actuation redundancy—an objective function is defined and $f_{mincon}$ is used to minimize the objective function while ensuring that the constraints are respected. In other implementations, an alternative optimization function and/or software package may be used to solve the equations of the quasi-static model of the vehicle 100.

Figure 4:
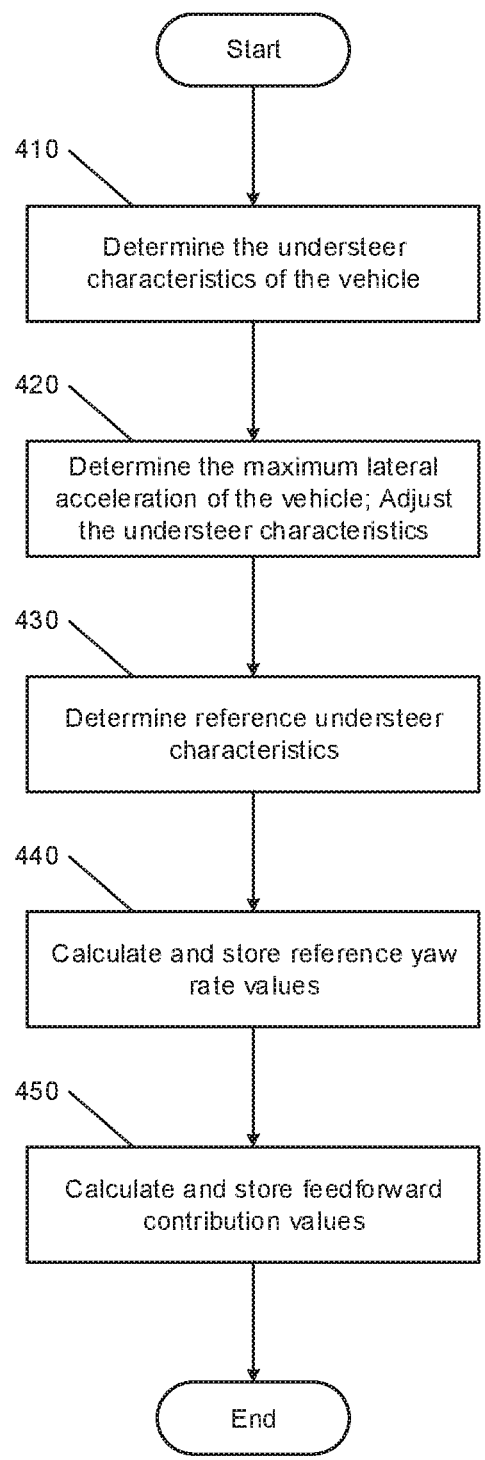
FIG. 4 flowchart of method of producing an anti-roll module using the quasi-static model of the vehicle.

In FIG. 4, a flowchart shows an example method of producing an anti-roll moment distribution module for a vehicle—such as the anti-roll moment distribution module 120 of the vehicle 100. The method begins at 410 with the computation of the understeer characteristics of a passive vehicle—i.e., the vehicle 100 without an anti-roll moment distribution system. The non-linear quasi-static model of the passive vehicle is solved for increasing values of lateral acceleration ($a_y$) and constant values of velocity (V), and optionally for longitudinal acceleration ($a_x$) or another relevant vehicle parameters ($\Theta$)—such as, an estimated tire-road friction coefficient ($\mu$). The calculations stop once a valid solution to the quasi-static model cannot be found. The calculations are run with a nominal value of the front-to-total anti-roll moment distribution parameter ($f_{nominal}$). The nominal value corresponds to the front-to-total anti-roll moment of the vehicle without an anti-roll moment distribution system. The result of the solution to the quasi-static model using $f_{nominal}$ represents the understeer characteristics of the vehicle without the anti-roll moment distribution system—$\delta_{dyn}(a_y)$. More specifically, one understeer characteristic ($\delta_{dyn}(a_y)$) is obtained for each velocity (V) and set of optional vehicle parameters ($\Theta$)—such as, $a_x$ and $\mu$. $\delta_{dyn}$ is the dynamic steering angle at the wheel—i.e., the difference between the actual steering angle and the kinematic steering angle, where the latter is the average steering angle of the front wheels required to make the vehicle travel on the considered trajectory radius at nearly zero speed. Alternatively, $\delta_{dyn}$ may refer to the steering wheel of the vehicle, and the understeer characteristic can be expressed as $\delta_{SW,dyn}(a_y)$.

The method continues with 420 where the maximum achievable value of lateral acceleration ($a_y$) and limit understeer characteristics of the vehicle 100 are determined. For a set of parameters, the limit understeer characteristic is considered as an extreme case that should not be exceeded when determining the reference vehicle cornering response. For example, since passenger cars are normally understeering, an understeer characteristic as close as possible to the neutral steering behavior and compatible with the specific actuator limitations may be considered as a limit understeer characteristic. The neutral steering behavior corresponds to a zero value of the dynamic steering angle ($\delta_{dyn}$). The limit understeer characteristics are calculated with an optimization procedure. This minimizes a cost function ($J_{ay,max}$). In one implementation, when the limit understeer characteristic is the neutral steering behavior. The cost function may be expressed as the absolute value of the dynamic steering angle. For example, the following formula may be used to calculate $J_{ay,max}$:

$$J_{ay,max} = w_{dyn}|\delta_{dyn}|$$

The optimization uses the non-linear quasi-static model formulation as a set of equality and inequality constraints. In other implementations, alternative cost function formulations may be used. For example, if a limit cornering response different from the neutral steering one is required, the term $w_{dyn}|\delta_{dyn}|$ may be replaced with the expression $w_{dyn}|\delta_{dyn}-\delta_{dyn,ref,lim}|$, where $\delta_{dyn,ref,lim}$ may be expressed as a function of lateral acceleration of the vehicle 100. For example, the following formula may be used to determine $\delta_{dyn,ref,lim}$:

$$\delta_{dyn,ref} = \begin{cases} k_{us}a_y & a_y < a_y^* \\ k_{us}a_y^* + (a_y^* - a_{y,max})k_{us}\log\left(\dfrac{a_y - a_{y,max}}{a_y^* - a_{y,max}}\right) & a_y^* \le a_y \le a_{y,max} \end{cases}$$

$\delta_{dyn,ref}$ represents $\delta_{dyn,ref,lim}$, $k_{us}$ is the understeer gradient of the linear part of the characteristic, $a^*_y$ is the upper limit of the linear part of the characteristic; and $a_{y,max}$ is the maximum achievable lateral acceleration.

The optimization is run for increasing values of $a_y$, for each velocity V and set of optional vehicle parameters ($\Theta$). The optimization stops when the constraints can no longer be satisfied. This occurs when the maximum achievable lateral acceleration ($a_{y,max}$) is reached. The additional outputs of this step are plots of $\delta_{dyn,ref,lim}(a_y)$ and $\delta_{lim}(a_y)$, for each velocity (V) and set of optional vehicle parameters ($\Theta$). $\delta_{dyn,ref,lim}(a_y)$ and $\delta_{lim}(a_y)$ plots may be considered as the limit understeer characteristics of the vehicle—i.e., the most extreme understeer characteristics to be evaluated in the design of the vehicle cornering response. In some implementations, $\delta_{lim}$ is the actual steering angle at the wheels of the vehicle—average steering angle at the front axle—including the kinematic and dynamic contributions. In other implementations, $\delta_{lim}$ may refer to the angle of the steering wheel of the vehicle 100.

The method continues with 430, where reference understeer characteristics necessary to achieve the desired vehicle cornering response are defined. For example, the desired vehicle response could be less understeering than that of the passive vehicle. The reference understeer characteristics should not conflict with the maximum achievable lateral acceleration and limit understeer characteristics determined in 420. The reference understeer characteristics can be expressed as an analytical function of lateral acceleration ($a_y$) with three parameters, $k_{us}$, $a^*_y$, and $a_{y,max}$. For example, the formula above for determining $\delta_{dyn,ref}$ may be used.

A visualization—for example, through a graphical user interface of a computer—of a plot of the understeer characteristics of the passive vehicle, the limit understeer characteristic, and the reference understeer characteristic may be presented. The reference understeer characteristics in terms of the actual steering angle—$\delta_{ref}(a_y)$—is then calculated. For example, the following formula may be used to calculate $\delta_{ref}(a_y)$:

$$\delta_{ref}(a_y) = \delta_{dyn,ref}(a_y) + \dfrac{la_y}{V^2}$$

The wheelbase of the vehicle is represented by l. In other implementations, the steering wheel angle, rather than the steering angle at the wheels, may be used to define the reference understeer characteristics.

The method continues with 440, where the reference yaw rate design is determined. In 430, the steering angle of the reference understeer characteristics was calculated as a function of lateral acceleration ($a_y$) for different values of V and $\Theta$ (to be used as breakpoints of the look-up tables). At 440, interpolation is performed to calculate the reference lateral acceleration ($a_{y,ref}$) as a function of the calculated steering angle values (also to be used as breakpoints of the look-up tables). Hence, the computation of the look-up tables of the steady-state value of the reference yaw rate—$r_{ref,ss}(\delta, V, \Theta)$—is achieved from the $\delta_{ref}(a_y)$ characteristics calculated at 430. The look-up table may be stored in the reference yaw rate module 230 of the anti-roll moment distribution module 120. The following formula may be used to calculate the reference yaw rates:

$$r_{ref,SS}(\delta, V, \Theta) = \begin{cases} -\dfrac{a_{y,ref,max}}{V} & \delta < -\delta_{a_y,max} \\ \dfrac{a_{y,ref}}{V} & -\delta_{a_y,max} \leq \delta \leq \delta_{a_y,max} \\ \dfrac{a_{y,ref,max}}{V} & \delta > \delta_{a_y,max} \end{cases}$$

$\delta_{a_y,max}$ represents the minimum value of steering angle for which $a_{y,ref,max}$ is achieved. In some implementations, each reference yaw rate ($r_{ref,SS}$) may be determined with respect to the angle of the steering wheel ($\delta_{SW}$) of the vehicle 100 rather than the steering angle of the wheels of the vehicle 100. For example, $r_{ref,SS}(\delta_{SW}, V, \Theta)$ may be calculated based on the determined values of $r_{ref,SS}(\delta, V, \Theta)$ and an appropriate steering ratio.

The method continues with 450. At 450, feedforward contribution values of the front-to-total anti-roll moment distribution are determined. The quasi-static model is solved to determine the required front-to-total anti-roll moment ratio required to achieve the reference understeer characteristic. In some implementations, $r_{ref,SS}(\delta, V, \Theta)$ is imposed as an equality constraint while solving the quasi-static model. In other implementations, $r_{ref,SS}(\delta_{SW}, V, \Theta)$ is imposed as an equality constraint while solving the quasi-static model. A look-up table of feedforward contribution values as a function of steering angle ($\delta$), velocity (V), and optional vehicle operating parameters ($\Theta$) is generated. For example, the look-up table of feedforward values may be stored in the feedforward module 220 of the anti-roll moment distribution module 120.

Figure 5:
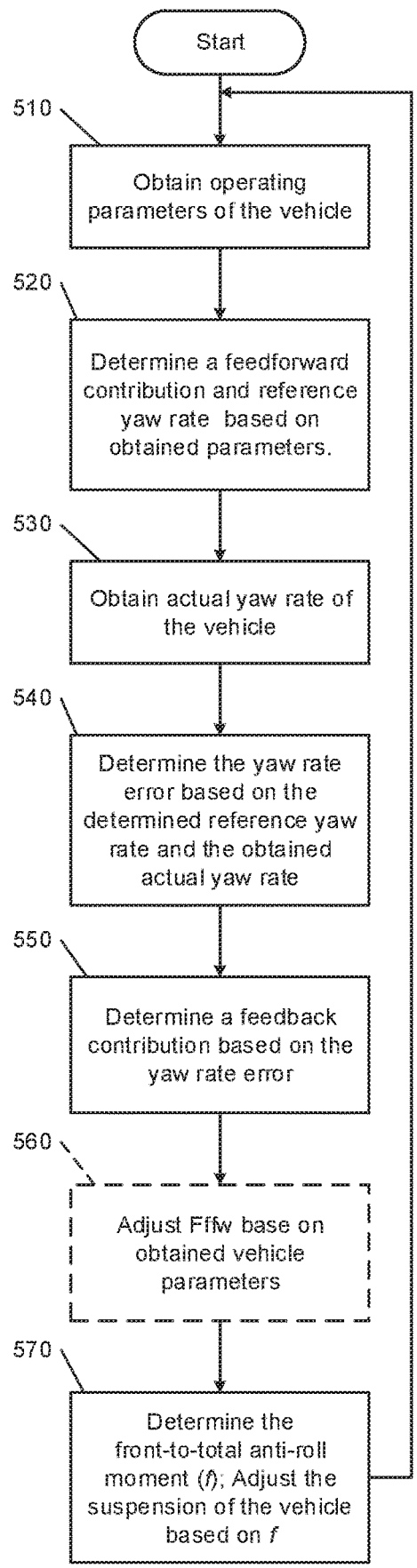
FIG. 5 flowchart illustrating an example method of performing suspension control in a vehicle according to the teachings of the present disclosure.

FIG. 5 is a flowchart that depicts an example method of controlling the suspension of a vehicle based on pre-stored feedforward and reference yaw rate values. In various implementations, control may be performed by the suspension control module 110 and the anti-roll moment distribution module 120. Control begins at 510, where control obtains operating parameters of the vehicle 100. For example, the steering angle of the wheels and the velocity and longitudinal acceleration of the vehicle are obtained. In some implementations, the angle of a steering wheel of the vehicle 100 is obtained rather than the actual steering angle of the wheels. Similarly, accelerator and brake pedal positions may be obtained in place of the vehicle's velocity and longitudinal acceleration. Control then continues with 520.

At 520, control determines a feedforward contribution to a front-to-total anti-roll moment distribution and a reference yaw rate of the vehicle 100 based on the obtained vehicle operating parameters. For example, the feedforward module 220 compares the obtained vehicle operating parameters to values stored in a first look-up table. The feedforward module 220 selects a stored feedforward value that is associated with the obtained vehicle parameters. The anti-roll moment distribution module 120 uses the selected feedforward value as the feedforward contribution.

Similarly, the reference yaw rate module 230 compares the obtained vehicle parameters to the values stored in a second look-up table. The reference yaw rate module 230 selects a stored reference yaw rate value that is associated with the obtained vehicle parameters. The anti-roll moment distribution module 120 uses the selected reference yaw rate value as the reference yaw rate. Control then progress to 530.

At 530, control obtains the actual yaw rate of the vehicle. For example, control may read the value of a signal from a yaw rate sensor located in the vehicle. Control then progresses to 540, where a yaw rate error is determined. Control calculates the yaw rate error based on the determined reference yaw rate and the obtained actual yaw rate of the vehicle. Control continues with 550.

At 550, control determines a feedback contribution to the front-to-total anti-roll moment distribution of the vehicle. Control determines the value of the feedback contribution based on the determined yaw rate error. For example, control may apply a correction to the yaw rate error based on proportional, integral, and derivative terms. The result of the correction is the feedback contribution. In some implementations, control progresses to 560—for example, when the anti-roll moment distribution module 120 includes the adjusting module 265. In other implementations, control progresses to 570.

At 560, control adjusts the feedforward contribution determined at 520. For example, the adjusting module 265 of the anti-roll moment distribution module 120 may apply a progressive deactivation algorithm to the feedforward contribution, to prevent undesired system responses in extreme conditions. The deactivation algorithm may include a transfer function that is applied to the feedforward contribution. In various implementations, the transfer function may be a first-order low pass filter. In some implementations, the transfer function may have a cutoff frequency of 5 Hz. In other implementations, the transfer function may have a cutoff frequency of 1 Hz. In yet other implementations, the transfer function may have a cutoff frequency between 1 Hz and 5 Hz Control then progresses to 570.

At 570, control determines a front-to-total anti-roll distribution ratio (f) based on the feedback contribution and either the feedforward contribution determined at 520 or the adjusted feedforward contribution determined at 560. For example, control may add either the feedforward contribution or the adjusted feedforward contribution to the feedback contribution. The resulting sum is the front-to-total anti-roll moment distribution (f). Control sets and/or adjusts the controllable suspension actuators of the vehicle 100 based on the front-to-total anti-roll moment distribution. Control then returns to 510.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to,"

"on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for controlling a suspension of a vehicle, comprising:
a plurality of sensors, wherein each sensor of the plurality of sensors is configured to measure an operating parameter of the vehicle;
an anti-roll moment module configured to determine a front-to-total anti-roll moment distribution based on at least a first operating parameter of the vehicle measured by a first sensor of the plurality of sensors;
at least one suspension actuator; and
a suspension control module configured to control the at least one suspension actuator based on the determined front-to-total anti-roll moment distribution, wherein the anti-roll moment module includes a feedforward module configured to determine a feedforward contribution based on at least the first operating parameter of the vehicle, and
the front-to-total anti-roll moment distribution is based on the determined feedforward contribution, wherein the feedforward module includes a first look-up table, the first look-up table includes a first plurality of entries, each entry of the first plurality of entries includes a feedforward contribution value based on a non-linear quasi-static model of the vehicle, and
the feedforward module is further configured to (i) select a first entry of the first plurality of entries of the first look-up table based on the first operating parameter and (ii) determine the feedforward contribution based on the first entry of the first plurality of entries, wherein:
the anti-roll moment module includes a yaw rate module configured to determine a reference yaw rate based on at least the first operating parameter of the vehicle, and
the front-to-total anti-roll moment distribution is based on the determined reference yaw rate, wherein the yaw rate module includes a second look-up table,
the second look-up table includes a second plurality of entries,
each entry of the second plurality of entries includes a reference yaw rate value based on the non-linear quasi-static model of the vehicle, and
the yaw rate module further is configured to (i) select a first entry of the second plurality of entries of the second look-up table and (ii) determine the reference yaw rate based on the first entry of the second plurality of entries,
the anti-roll moment module including:
an error module configured to determine a yaw rate error based on (i) the reference yaw rate and (ii) a second operating parameter of the vehicle measured by a second sensor of the plurality of sensors, and
a feedback module configured to determine a feedback contribution based on the yaw rate error,
the second operating parameter is a yaw rate of the vehicle, and
the feedback module is configured to determine the feedback contribution by applying a correction to the yaw rate error based on proportional, integral, and derivative terms.

2. The system of claim 1, wherein the anti-roll moment module includes a front-to-total module configured to determine the front-to-total anti-roll moment distribution based on the feedforward contribution and the feedback contribution.

3. The system of claim 1, wherein the anti-roll moment module includes:
an adjusting module configured to determine an adjusted feedforward contribution based on (i) the feedforward contribution and (ii) at least one of the yaw rate error or a slip angle of a rear axle of the vehicle, and
a front-to-total module configured to determine the front-to-total anti-roll moment distribution based on the adjusted feedforward contribution and the feedback contribution.

4. A method of controlling a suspension of a vehicle, comprising:
obtaining a plurality of operating parameters of the vehicle;
determining a front-to-total anti-roll moment distribution based on at least a first operating parameter of the plurality of operating parameters of the vehicle;
adjusting at least one controllable suspension actuator of the vehicle based on the determined front-to-total anti-roll moment distribution,
determining a feedforward contribution based on at least the first operating parameter of the vehicle, wherein the front-to-total anti-roll moment distribution is based on the determined feedforward contribution, wherein
determining the feedforward contribution includes selecting a first entry from a first look-up table,
the first look-up table includes a first plurality of entries, and
each entry of the first plurality of entries includes a feedforward contribution value that is based on a non-linear quasi-static model of the vehicle;
determining a reference yaw rate based on at least the first operating parameter of the vehicle, wherein the front-to-total anti-roll moment distribution is based on the determined reference yaw rate, wherein
determining the reference yaw rate includes selecting a first entry from a second look-up table,
the second look-up table includes a second plurality of entries, and
each entry of the second plurality of entries includes a reference yaw rate value that is based on the non-linear quasi-static model of the vehicle:
determining a yaw rate error based on (i) the reference yaw rate and (ii) a second operating parameter of the plurality of operating parameters of the vehicle, wherein the second operating parameter is a yaw rate of the vehicle; and
applying a correction to the yaw rate error based on proportional, integral, and derivative terms to determine a feedback contribution.

5. The method of claim 4, wherein determining the front-to-total anti-roll moment distribution includes adding the feedforward contribution to the feedback contribution.

6. The method of claim 4, further comprising determining an adjusted feedforward contribution based on (i) the feedforward contribution and (ii) at least one of the yaw rate error or a slip angle of a rear axle of the vehicle,
   wherein determining the front-to-total anti-roll moment distribution includes adding the adjusted feedforward contribution to the feedback contribution.

\* \* \* \* \*